United States Patent
Feroz et al.

(10) Patent No.: US 9,891,940 B2
(45) Date of Patent: Feb. 13, 2018

(54) INTROSPECTION METHOD AND APPARATUS FOR NETWORK ACCESS FILTERING

(71) Applicant: Nicira, Inc., Palo Alto, CA (US)

(72) Inventors: Azeem Feroz, San Jose, CA (US);
Vasantha Kumar, Tamil Nadu (IN);
James Christopher Wiese, Dublin, CA (US); Amit Vasant Patil, Pune (IN)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/814,413

(22) Filed: Jul. 30, 2015

(65) Prior Publication Data

US 2016/0191521 A1 Jun. 30, 2016

(30) Foreign Application Priority Data

Dec. 29, 2014 (IN) .......................... 6687/CHE/2014

(51) Int. Cl.
*G06F 21/00* (2013.01)
*G06F 9/455* (2018.01)
(Continued)

(52) U.S. Cl.
CPC .... *G06F 9/45558* (2013.01); *G06F 17/30867* (2013.01); *H04L 63/0236* (2013.01);
(Continued)

(58) Field of Classification Search
CPC ........... G06F 17/30867; G06F 9/45558; G06F 2009/45587; G06F 2009/45595;
(Continued)

(56) References Cited

U.S. PATENT DOCUMENTS 6,363,477 B1 * 3/2002 Fletcher .............. H04L 12/2697
709/223
8,484,739 B1 * 7/2013 Seshadri ............. G06F 11/3006
709/224

(Continued)

*Primary Examiner* — Yogesh Paliwal
(74) *Attorney, Agent, or Firm* — Adeli LLP

(57) ABSTRACT

Some embodiments of the invention provide a method for performing network access filtering and/or categorization through guest introspection (GI) on a device. In some embodiments, this GI method intercepts directly on a device a data message that device is preparing to send, and uses a service appliance to determine whether the data message can be sent. The device in some embodiments is a guest virtual machine (VM) that executes on a multi-VM host computing device along with a service VM (SVM) that is the service appliance that determines whether the data message can be sent based on a set of filtering rules. In some embodiments, the method uses one or more introspectors (e.g., network introspector and/or file introspector) to capture introspection data from the guest VM (GVM) about the data message that the GVM is preparing to send. To perform the network access filtering, the GI method in some embodiments captures contextual information, such as user and application information (e.g., application associated with a particular URL request). Hence, in some embodiments, this method seamlessly processes granular user-aware URL filtering rules (e.g., members of the sales organization can access social networking sites but not other members). This approach requires no additional configuration on networking infrastructure.

21 Claims, 10 Drawing Sheets

(51) Int. Cl.
*H04L 29/06* (2006.01)
*G06F 17/30* (2006.01)

(52) U.S. Cl.
CPC ...... *H04L 63/0281* (2013.01); *H04L 63/0876* (2013.01); *H04L 63/20* (2013.01); *G06F 2009/45587* (2013.01); *G06F 2009/45595* (2013.01)

(58) Field of Classification Search
CPC . H04L 47/801; H04L 47/808; H04L 63/0236; H04L 63/0281; H04L 63/0876; H04L 63/20
USPC .......................................................... 726/1
See application file for complete search history.

(56) References Cited

U.S. PATENT DOCUMENTS

| | | |
|---|---|---|
| 9,565,202 B1 | 2/2017 | Kindlund et al. |
| 2002/0116523 A1* | 8/2002 | Warrier ............. H04L 29/12009 709/238 |
| 2007/0143851 A1 | 6/2007 | Nicodemus et al. |
| 2011/0238581 A1 | 9/2011 | Severson et al. |
| 2013/0205366 A1 | 8/2013 | Luna et al. |
| 2014/0215226 A1* | 7/2014 | Litty ....................... G06F 21/53 713/193 |
| 2014/0282539 A1* | 9/2014 | Sonnek ............... G06F 9/45558 718/1 |

\* cited by examiner

INTROSPECTION METHOD AND APPARATUS FOR NETWORK ACCESS FILTERING

BACKGROUND

In today's connected world, enterprises expect their employees to access external websites as a means for boosting productivity by leveraging what the Internet today offers in terms of enhanced collaboration, communication and information gathering and sharing. However, this also opens up these enterprises to potential malicious attacks when employees access websites that can be source of malware or phishing attacks, which, in turn, expose the entire internal enterprise network to malicious attacks. In addition, there have been several recent cases of employees (either intentionally or inadvertently) leaking enterprise trade secrets or confidential data as a result of unfettered access to the cloud.

Because of this, enterprises today recognize the need for URL (uniform resource locator) filtering as applied to their employee needs to access the Internet. Specifically, enterprises have shifted away from providing unfettered access to the Internet to defining strict policies on what URLs or URL categories employees can access, in order to avoid leaks of sensitive information (e.g., company assets or customer data), legal issues due to employees accessing unauthorized content, and loss of productivity due to employees accessing social networking sites.

During the infancy of the Internet, URL filtering was merely implemented via firewall rules but as the Internet quickly grew from a few thousand to millions of URLs, that strategy quickly became unusable due to issues with scale. URL filtering quickly evolved into deploying an appliance inline with all network traffic thereby enabling visibility into all outgoing network access. As the load on these appliances grew, specialized appliances that only inspected outgoing web traffic became the norm. These appliances were sometimes deployed as explicit proxies or in other cases as transparent proxies, also known as Secure Web Gateways (SWGs).

These proxies look at the header of every URL headed to the Internet, identify the URL being accessed and lookup the URL being accessed in a database that categorizes the URL into different Web categories, such as entertainment, social networking, news, malware, etc. The categorized URL is then compared against the policy defined by the enterprise to come up with an enforcement decision on the URL. Access to the URL is then allowed or denied.

The above approach falls short when HTTPS is used to access external URLs. Since the headers are already encrypted by the time the outgoing URL request reaches the proxy, the proxy cannot categorize the URL. Enterprises solve this by running SSL proxies that have to decrypt the outgoing traffic in order to categorize the URL and re-encrypt to preserve the integrity of the secure connection.

There are several drawbacks with the above approaches. In case of unencrypted traffic, the proxy has to be explicitly configured on each client or all traffic destined to a particular port (e.g., port 80) has to be redirected to the proxy via a Layer 4 switch configuration or other redirecting mechanisms (in case of transparent proxies). For transparent proxies, redirecting traffic based on port number is prone to being defeated by web servers not running on standard ports. In either case, it is difficult to create URL policies based on user identity.

In the case of encrypted traffic, in addition to the above drawbacks, performance becomes a major issue considering that the SSL proxy is both encrypting and decrypting all outgoing web traffic. In most cases, the use of SSL proxy technology also requires manual configuration of the client's browser with a root certificate authority of the appliance server in the trusted list.

BRIEF SUMMARY

Some embodiments of the invention provide a method for performing network access filtering and/or categorization through guest introspection (GI) on a device. In some embodiments, this GI method intercepts directly on a device a data message that device is preparing to send, and uses a service module to determine whether the data message can be sent. The device in some embodiments is a guest virtual machine (VM) that executes on a multi-VM host computing device along with a service VM (SVM) that is the service module that determines whether the data message can be sent based on a set of filtering rules. In some embodiments, the method uses one or more introspectors (e.g., network introspector and/or file introspector) to capture introspection data from the guest VM (GVM) about the data message that the GVM is preparing to send.

To perform the network access filtering, the GI method in some embodiments captures contextual information, such as user and application information (e.g., application associated with a particular URL request). Hence, in some embodiments, this method seamlessly processes granular user-aware URL filtering rules (e.g., members of the sales organization can access social networking sites but not other members). This approach requires no additional configuration on networking infrastructure.

The GI method in some embodiments intercepts the data message before it can be encrypted. Accordingly, this method works particularly well for encrypted traffic, because it can obviate the need for expensive decryption operations. By avoiding the need to decrypt and re-encrypt the network traffic, the GI method of some embodiments avoids the performance pitfalls of existing solutions.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for performing network access filtering and/or categorization through guest introspection (GI) on a device. In some embodiments, this GI method intercepts directly on a device a data message that device is preparing to send, and uses a service module to determine whether the data message can be sent. As used in this document, a data message refers to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc.

The device in some embodiments is a guest virtual machine (VM) that executes on a multi-VM host computing device along with a service VM (SVM) that is the service module that determines whether the data message can be sent based on a set of filtering rules. Instead of a SVM, some embodiments use another process that executes on the host (e.g., a user-space process) to determine whether the data message can be sent based on the set of filtering rules. In some embodiments, the method uses one or more introspectors (e.g., network introspector and/or file introspector) to capture introspection data from the guest VM (GVM) about the data message that the GVM is preparing to send. The introspectors are installed on the GVMs in some embodiments.

To perform the network access filtering, the GI method in some embodiments captures contextual information, such as user and application information (e.g., application associated with a particular URL request). Hence, in some embodiments, this method seamlessly processes granular user-aware URL filtering rules (e.g., members of the sales organization can access social networking sites but not other members). This approach requires no additional configuration on networking infrastructure.

The GI method in some embodiments intercepts the data message before it can be encrypted. Accordingly, this method works particularly well for encrypted traffic, because it can obviate the need for expensive decryption operations. By avoiding the need to decrypt and re-encrypt the network traffic, the GI method of some embodiments avoids the performance pitfalls of existing solutions.

Figure 1:
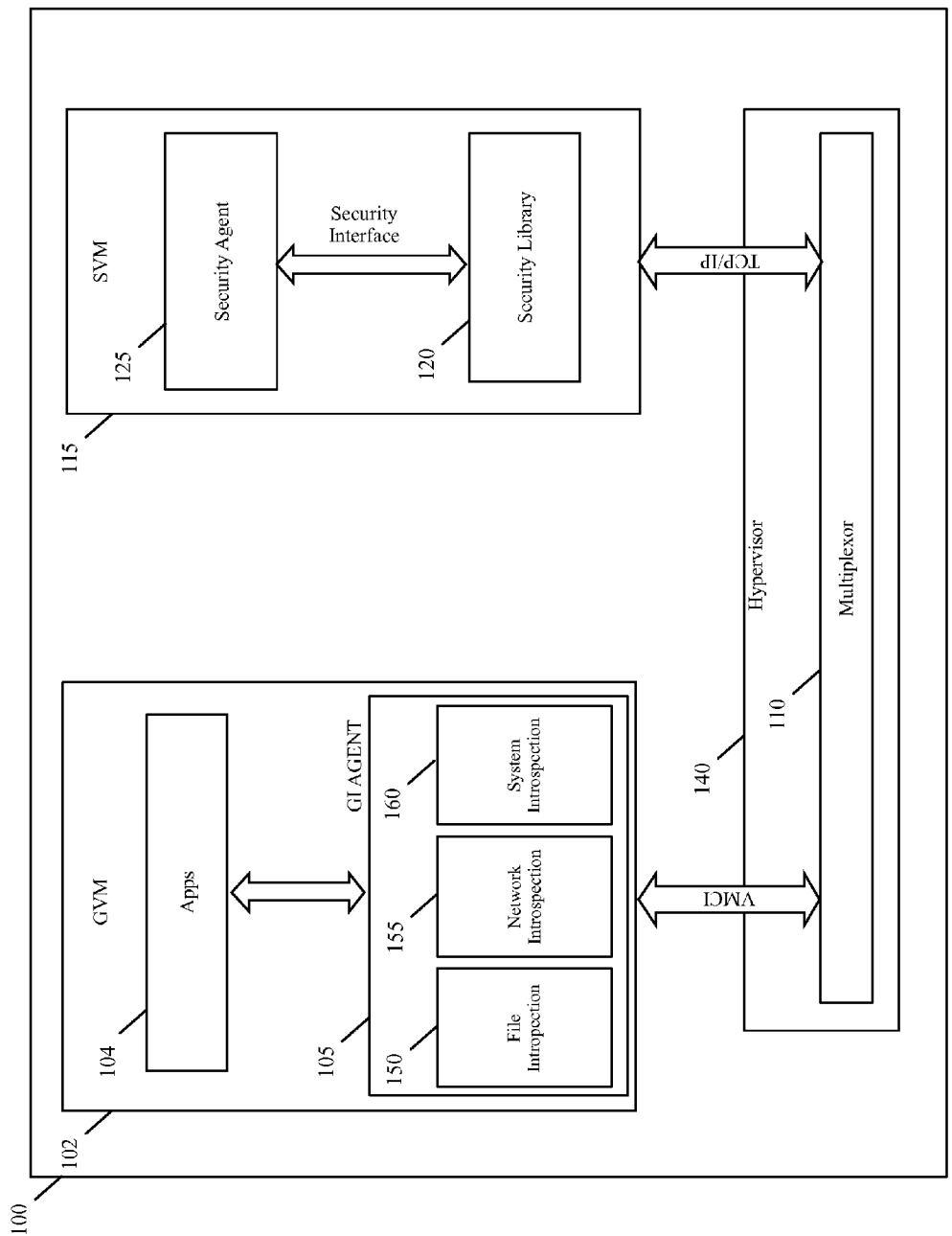
FIG. 1 illustrates a host computing device on which the GI architecture of some embodiments is utilized.

Several more detailed embodiments of the invention will now be described. In several of these exemplary embodiments, the guest introspection is implemented on GVMs that are executing on multiple hosts in a Software Defined Data Center (SDDC). FIG. 1 illustrates a host computing device 100 on which the GI architecture of some embodiments is utilized. In this architecture, the guest introspection provides information about sensitive data, the applications and the users accessing them, and where and how the sensitive data flows in the network.

The guest introspection in this architecture is achieved by installing an introspection agent 105 on a GVM 102 executing on the host 100. Specifically, as shown in FIG. 1, the GI architecture 100 of some embodiments includes a GI agent 105, a multiplexor 110, and a SVM 115. As further shown, the SVM 115 includes a security library 120 and a security agent 125.

In some embodiments, the GI agent 105 is a thin, in-guest component running in every GVM in the datacenter. When an application 104 on the GVM 102 tries to send a data message through the GVM's network stack (e.g., TCP/IP stack), the agent intercepts file-system events, network events, and/or operations associated with this attempt, and delivers these events and/or operations to the SVM 115 along with metadata (such as application and user information) that the agent captures. In some embodiments, the agent 105 can process additional requests from the SVM in order to capture more data about the attempted network access. Based on the capture data, the SVM allows or rejects the network attempt and provides its verdict to the agent 105. Based on the received SVM verdict, the agent then either has the GVM allow or reject the network access that the application is attempting to make.

The multiplexor (MUX) 110 is a user-world module running on the host. Through the MUX, various introspectors 150, 155 and 160 of the agent can send messages to the SVM 115. In some embodiments, the introspectors provide the introspection messages to the MUX 110 through a VM communication interface (e.g., the VMCI interface of VMware Inc.). In some embodiments, the mux 110 is a module running on a hypervisor 140 (e.g., the ESX hypervisor of VMware Inc.) that executes on the host. The hypervisor 140 is a software layer that enables the virtualization of the shared hardware resources of the host. Multiple VMs (e.g., GVMs or SVMs) execute on top of this hypervisor. In addition to the multiplexor 110, the hypervisor 140 in some embodiments provides other shared software resources, such as a software forwarding element that performs software switching operations on the host and provides virtualized shared access to at least on network interface card (NIC) of the host.

As shown in FIG. 1, the introspectors of the GI agent in some embodiments include the file introspector 150, the network introspector 155, and system introspector 160. As further described below, the file introspector 150 captures metadata about one or more files that a GVM application is accessing for a network access. Some embodiments use the system introspector 160 to obtain system level data for the SVM to assess in allowing or rejecting a network access. Other embodiments do not use the system introspector. In some embodiments, the file and system introspectors are implemented like the endpoint introspecting agents of the vShield product of VMware Inc. Information about these introspector can be found on the Internet.

In some embodiments, the network introspector 155 of the agent 105 in some embodiments is called by the GVM's network stack (e.g., TCP/IP stack) each time the stack initiates a connection request. Through these calls, the network introspection module captures (1) every new connection request (e.g., both incoming and outgoing connection requests) that is made by an application that is operating on the GVM 102, and (2) contextual information (e.g., user identity, application context, etc.) for the new connections. In some embodiments, different flows are differentiated based on the source port that is associated with the connection session that is associated with the flow.

For outgoing connections, the network inspector in some embodiments can precisely identify which user initiated the connection, including the Active Directory (AD) groups of which the user is a member. For instance, if different users from the Finance and Human Resources groups of an enterprise are logged in on a terminal server, the network introspector of some embodiments can identify which user from which group initiated a particular network connection. Also, in some embodiments, the network introspector provides the application context with each network connection initiated or accepted by a GVM. For instance, the network introspector in some embodiments provides information about the application associated with every outgoing connection. For incoming connections, it provides detailed information on the listening application in some embodiments. This information in some embodiments includes name of the process, application hash, publisher, etc. The network introspector enables the gathering of this information without the need to do costly deep packet introspection on the received GVM data messages.

Through the MUX 110, the GI agent 105 in some embodiments provides the captured connection information and their associated contextual metadata to the SVM 115. As shown, the communication from the introspectors and the MUX are relayed to the SVM's security agent 125 through the SVM's security library, which establishes a secure channel (e.g., secure TCP/IP connection) for these communications. For each attempted data message flow, the SVM's agent 125 examines its configuration and cache stores (not shown) to determine whether the attempted network event or operation is an event or operation that should be allowed or denied. The SVM agent then relays its decision through the secure channel (established by the security library 120) and the MUX 110 to the GI agent 105. In some embodiments, the security library 120 provides APIs to register for guest events of interest for processing and provides semantics to the SVM's agent 125 so this agent is able to provide the verdict for a network event. In some embodiments, the SVM is an appliance that is licensed from a security vendor, such as McAfee, TrendMicro, Symantec, VMware, etc.

The network access filtering of some embodiments primarily relies on introspection data captured by the network introspector 155 and file introspector 150 of the GI agent 105. In some embodiments, network introspection in GVMs is achieved through filtering the application network calls at the socket layer. The network introspector captures some or all network socket events inside the guest. These events are then sent to the SVM for analysis and form the basis of providing user and application context on a per-connection basis. By filtering the socket calls just above TCP/IP driver, rule enforcement can also be achieved by either blocking or allowing a socket call. To capture the outgoing TCP connection and disconnection event, the socket calls "connect" & "closesocket" are filtered by the introspector 155 in some embodiments. Similarly on the socket server side, server-listen and inbound TCP connection events are delivered to the network introspector 155 by filtering "listen" and "accept" socket calls. This way the SVM can make allow/deny decisions for the incoming TCP connections similarly to its decisions of outbound TCP connections.

In some embodiments, the network introspector 155 uses a transport layer (L4 layer) filter of the GVM's operating system, in order to capture introspection data from applications executing on the introspector's host computing device. For example, for a GVM that executes a Microsoft Windows operating system, the network introspector in some embodiments captures the network calls through a Transport Driver Interface (TDI) filter driver. On the other hand, for a GVM that executes a Linux operating system, the network introspector in some embodiments captures the network calls through the Netfilter library, as further described below.

Using the TDI filter, the network introspector of some embodiments captures all network socket events inside the GVM. These events are then sent to the SVM for analysis and form the basis of providing user and application context on a per-connection basis. In the Windows environment, TDI provides a common interface to communicate with the protocol drivers such as TCP/IP, NETBIOS, etc. These interfaces are consumed by the upper layer socket library to perform network operations requested by the applications. In other words, the TDI layer provides a common interface for socket libraries to communicate with the protocol drivers such as TCP/IP, NETBIOS. As these interfaces are consumed by the socket library, each TDI calls will map to a socket call made by the application.

By filtering the requests just above TCP/IP driver, the TDI filter driver provides a mechanism to block or allow a socket call. In some embodiments, the network introspector 155 uses the TDI_CONNECT and IRP_MJ_CLOSE filters to direct the TDI driver to capture and block "connect" and "closesocket" socket calls respectively. After calling the network inspector for a socket connection request, TDI maintains the connection request blocked until it receives a response from the network introspector 155. In turn, after capturing and blocking a socket connection request, the network introspector reports this connection event to the SVM, which can then make allow/deny decision for the incoming connection. After receiving the event, the SVM can request further information (such as the user, application and additional contextual information) for the network event. Based on this contextual information and policies configured by the security administrator, the SVM can either allow or deny the network connection.

For traffic that is incoming to the GVM (e.g., for the case that the GVM serves as a server from which data is pulled), the network introspector 155 uses TDI_LISTEN and TDI_EVENT_CONNECT requests to direct the TDI driver to capture server listen events and inbound TCP connection events. TDI_LISTEN directs the TDI transport driver to listen for an offer to make an endpoint-to-endpoint connection from a remote node, while TDI_EVENT_CONNECT registers a given client routine to be called when an endpoint-to-endpoint connection is offered by a remote-node peer. After calling the client routine, TDI maintains the connection request block until it receives a response from the network introspector 155. In turn, after capturing and blocking a remote connection request, the network introspector reports this remote connection event to the SVM, which can then make allow/deny decision for the incoming connection.

Some embodiments extend the GI framework for client and server events to deliver data streams in the sockets. In order to intercept the data sent and received on a socket, the network introspector of some embodiments uses the TDI_SEND, TDI_RECEIVE and TDI_EVENT_RECEIVE requests of the TDI driver to capture data that is being prepared to be sent, received or receive notification through the event handler. When the TDI driver provides data to the network introspector in response to such requests, it blocks the outgoing data from being sent and the incoming data from being delivered to its associated application until it receives a response from the network introspector. The network introspector sends the intercepted data to the SVM, which can allow the data to be sent or delivered, or it can either inject different data in the stack or drop the data entirely.

In addition to capturing every new incoming or outgoing connection request, the network introspector of some embodiments can capture additional contextual information (such as user identity and application context) for every connection through TDI module, as mentioned above. This additional contextual information allows the GI architecture of some embodiments to perform URL filtering efficiently by only capturing data streams from connections initiated by only known web browsers.

On the Linux platform, the network introspector 155 of some embodiments uses the Netfilter library to filter out the data packets. To do this, some embodiments use a kernel module that uses Netfilter to intercept the packets coming-in/going-out of the GVM. As part of this intercept, the network introspector gathers connection information and sends it to the user-space program using Netlink channel. Alternatively, some embodiments have the user space Netfilter client that intercepts the packets coming-in/going-out of the GVM.

Figure 2:
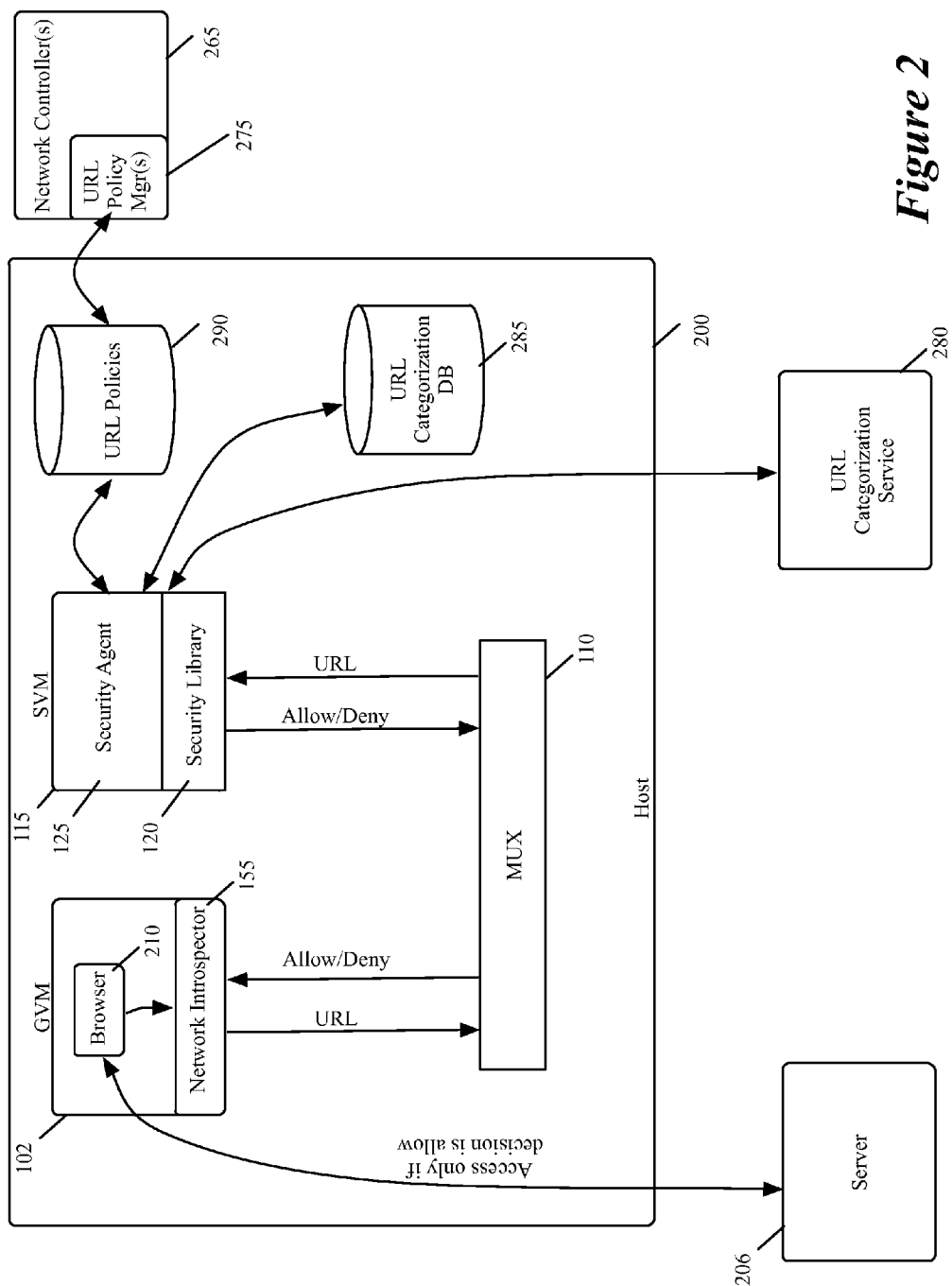
FIG. 2 illustrates a GI architecture of some embodiments for performing URL filtering.

FIG. 2 illustrates a GI architecture of some embodiments for performing URL filtering. In this example, a network introspector 155 captures connections initiated by a web browser 210 of a GVM 102 to a server 206. The network introspector 155 captures connections through a transport layer filter (such as the TDI filter) or higher layer filter. To increase the efficiency of its URL filtering, the network introspector 155 in some embodiments only captures connections initiated by one or more known web browsers, which the introspector can identify because it has application context, including the application name and hash. To prevent someone from circumventing the filtering scheme by using a web browser that is not monitored by the guest introspector, some embodiments use application white-listing techniques to prevent users from installing unknown or unmonitored browser applications on the GVM 202. Although the browser 210 is shown as the monitored application in the example of FIG. 2, one of ordinary skill will realize that the architecture of this figure is used in some embodiments to monitor the network access of other applications that execute on the GVM 202.

The GI architecture of FIG. 2 is similar to the architecture of FIG. 1, except FIG. 2 also shows the GI architecture to include URL categorizing service provider 280 and database 285, and policy configuration storage 290. In this architecture, the SVM 115 (1) uses the categorization service provider 280 or database 285 to try to identify one or more categories for a URL that a browser is attempting to access, and (2) uses the policy configuration storage 290 to determine whether the access should be allowed or denied. When a category is identified for a URL, the SVM's policy determination of whether the access should be allowed or denied is at least partly dependent on the identified category.

In some embodiments, a set of one or more controllers 265 publishes the policies for URL filtering as defined by a security administrator. As shown in FIG. 2, the policies are published by one or more URL policy managers 275 that execute on one or more controllers in the controller set 265, and these published policies are stored in the policy configuration data storage 290. In the example illustrated in FIG. 2, the SVM 215 that performs the filtering operation, executes on the same host 200 as the GVM 102 in which the browser 210 operates. In other embodiments, the SVM executes on a different host than the GVM 102.

Figure 3:
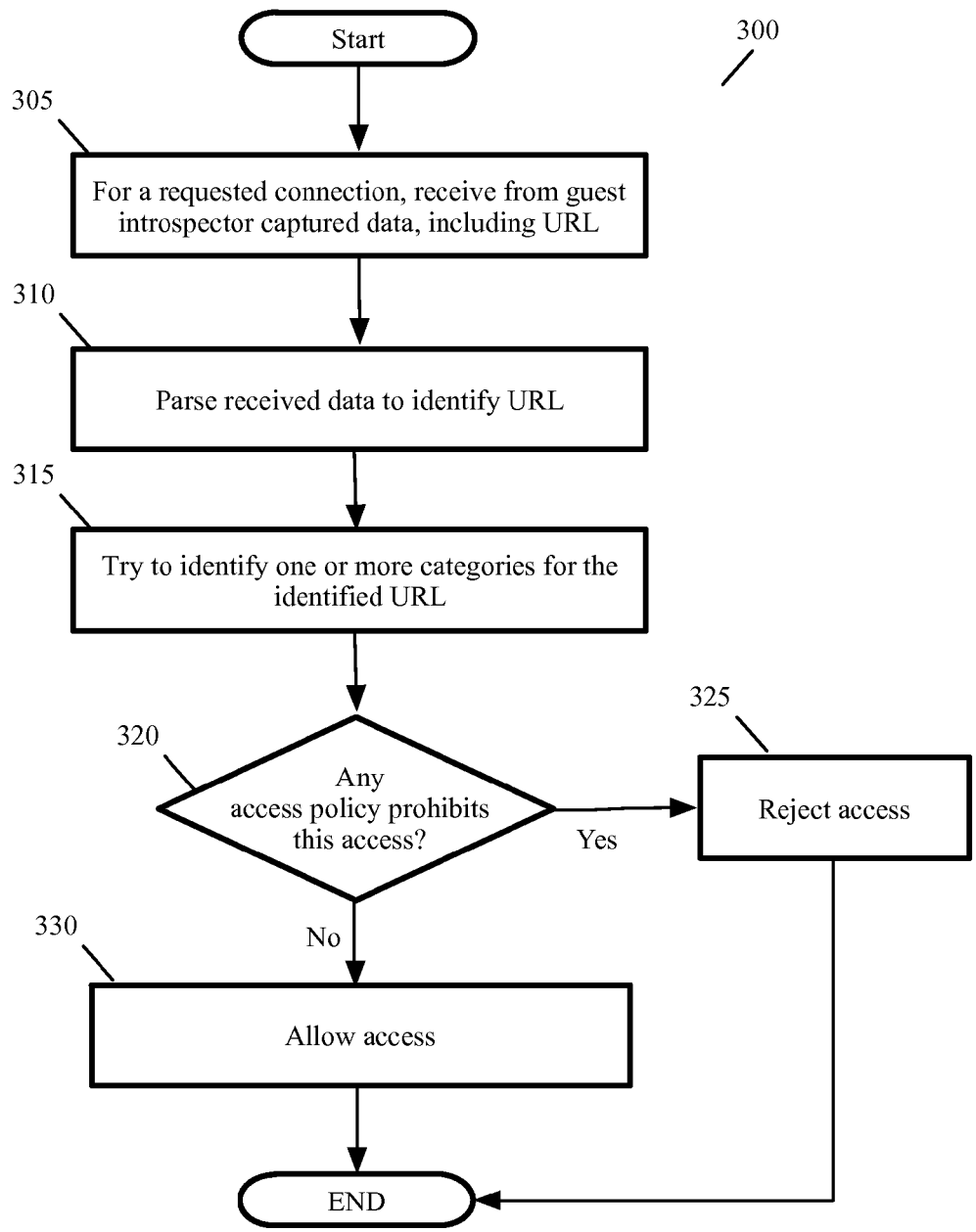
FIG. 3 presents a process that conceptually illustrates the operation of the SVM's security agent of FIG. 2 when a monitored browser attempts to access a web resource that is identified by a URL.

FIG. 3 presents a process 300 that conceptually illustrates the operation of the SVM's security agent 125 of FIG. 2 when a monitored browser attempts to access a web resource that is identified by a URL. By performing these operations, the security agent 125 can determine whether the attempted access should be allowed. As shown, the process 300 initially receives (at 305) data from the network introspector 155 for a connection that the browser 210 is attempting to make to a web resource that is identified by a URL.

For URL filtering, the network introspector 155 in some embodiments has the TDI driver capture (1) an outgoing connection request that identifies a new network connection, (2) contextual information (e.g., the process identifier and/or user identifier) that identifies a web browser as the application making the connection request and/or a user identifier that identifies the user for which the application is making the attempted network access, and (3) one outgoing data packet that identifies the URL that is being accessed. In some embodiments, the network introspector captures the connection request and contextual information before allowing the TCP/IP stack from sending a SYN message to establish the TCP/IP connection session, while capturing the URL after the TCP/IP stack sends the ACK message and before a first data packet is allowed to be sent. In some embodiments, the URL is part of the payload of the first data packet.

Upon receiving the GI captured data (including contextual data and outgoing data packet), the agent 125 parses (at 310) the payload of the first packet in order to identify the URL associated with the connection. Next, at 315, the agent 125 identifies one or more categories for the URL by interfacing with either the cloud-based URL categorization service provider 280 or a local database 285.

The cloud-based service provider 280 provides one or more categories (e.g., adult material, business, collaboration, education, entertainment, gambling, government, health, etc.) for a URL that the security agent 125 sends the provider through the host's NIC and one or more intervening networks (such as the Internet). Examples of such service providers include Zscaler, Bluecoat, etc. The local database 285 has one or more lookup tables that map a URL to one or more categories. In some embodiments, the security agent 125 caches in the database 285 results that the service provider 280 sends to it for earlier requests. Also, in some embodiments, the security agent 125 first checks the local database 285 to identify a category for a URL, and then checks with the service provider when it cannot identify a category for a URL in the database 285. In some embodiments, the security agent 125, the service provider 280, or the database 285 assigns a default category when a non-default category for the identified URL cannot be identified.

After trying (at 315) to identify a category for the URL, the security agent 125 examines the access policies in the policy storage 290 to determine whether it should allow or deny the requested connection to the web resource identified by the URL. Examples of policies include block all access to file-sharing website, block all access to social media site for users who are not in the marketing department, only allow access to entertainment sites to the executive staff, etc.

In some embodiments, the security agent allows the access when it cannot find any policies in the policy storage that rejects this access. Also, in some embodiments, one or more stored policies include access rules that reject a network access irrespective of the category that was identified for the URL. However, in these embodiments, one or more policies include access rules that are dependent of the identified category for the URL. For example, a policy might reject any network access that is made by individuals that belong to a first active directory group, while another policy might reject access to social media sites by individuals that belong to a second active directory, whose members can access non-social media sites.

Figure 4:
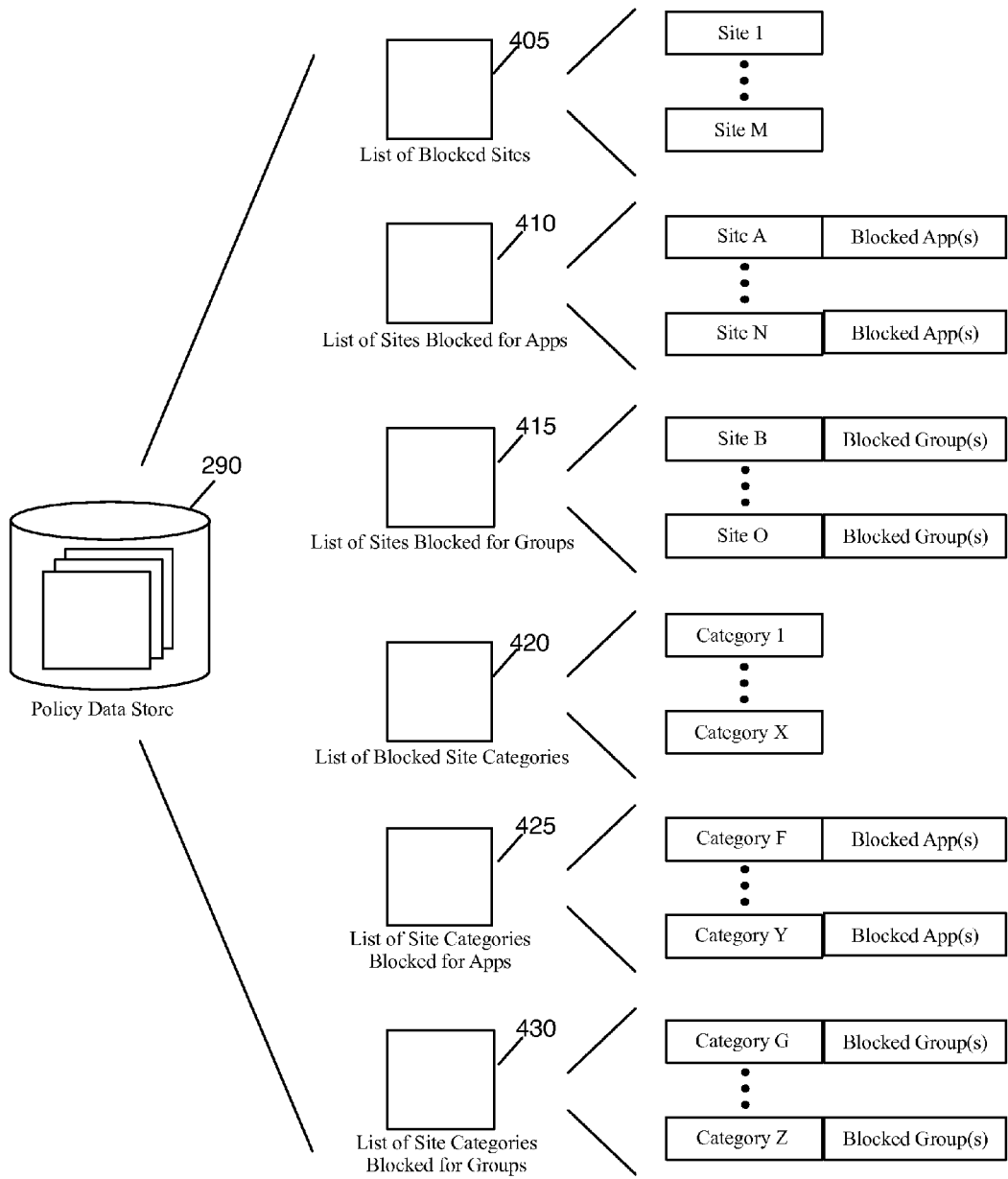
FIG. 4 illustrates several examples of policies that are used in some embodiments.

FIG. 4 illustrates several examples of policies that are used in some embodiments. As shown, the policy storage 290 in some embodiments includes multiple tables that set out multiple different types of policies. In this example, these tables include site tables 405-415 that list sites that are blocked, and category tables 420-435 that list site categories that are blocked. The site tables include (1) a general site table 405 that identifies sites that are blocked for everyone, (2) an application site table 405 that identifies sites that are blocked for certain applications (e.g., that are blocked for accounting applications), and (3) a group site table 405 that identifies sites that are blocked for certain groups of users (e.g., for certain active directory group).

The category tables include (1) a general category table 420 that identifies site categories that are blocked for everyone, (2) an application category table 405 that identifies site categories that are blocked for certain applications (e.g., that are blocked for accounting applications), and (3) a group category table 405 that identifies site categories that are blocked for certain groups of users (e.g., for certain active directory group). The category for an attempted network access that is checked by the process 300 is the category that is identified at 315.

In some embodiments, the process 300 will reject an attempted network access when the accessed site or its associated category are listed as being blocked for everyone, for the application that is attempting the network access, or for the group that contains the user or machine that is attempting the network access. Other embodiments use other types of access policies, such as policies that require actions other than Allow or Deny, e.g., add some rate control, bandwidth control or QoS policies based on URL categories. For instance, in some embodiments, a policy directs the guest introspector to limit the aggregate bandwidth to 1% of link speed when the URL category is P2P, while another policy directs the introspector to ensure that a 1 Mbps per connection when the URL category is Meeting (e.g., Webex). In some embodiments, the access policies are maintained in fewer tables. For instance, in some embodiments, the access policies are maintained in a single table that stores the policies based on a hierarchy that is based on the importance (e.g., the more important policies appear earlier in the table).

When the security agent identifies (at 320) a policy that prohibits the requested access, the security agent returns (at 325) a Deny to the network introspector 155, which, in turn, has the TDI filter driver reject the attempted connection. In rejecting the attempted connection, some embodiments present a message on the browser that explains the reason for the rejection. After 325, the process 300 ends. On the other hand, when the security agent cannot identify (at 320) a policy that prohibits the requested access, the security agent returns (330) an Allow to the network introspector 155, which, in turn, has the TDI filter driver allow the attempted connection. After 330, the process 300 ends.

The approach illustrated in FIG. 2 works well for URL filtering encrypted traffic. Secure data communications across the networks is usually implemented by using Layer 3 security protocols (such as IPsec) or Layer 5 or 6 security protocols (such as SSL/TLS). As used in this document, layer 2 (L2), layer 3 (L3), layer 4 (L4), layer 5 (L5), layer 6 (L6), and layer 7 (L7) are references respectively to the second data link layer, the third network layer, the fourth transport layer, the fifth session layer, the sixth presentation layer and the seventh application layer of the OSI (Open System Interconnection) conceptual seven layer model.

Figure 5:
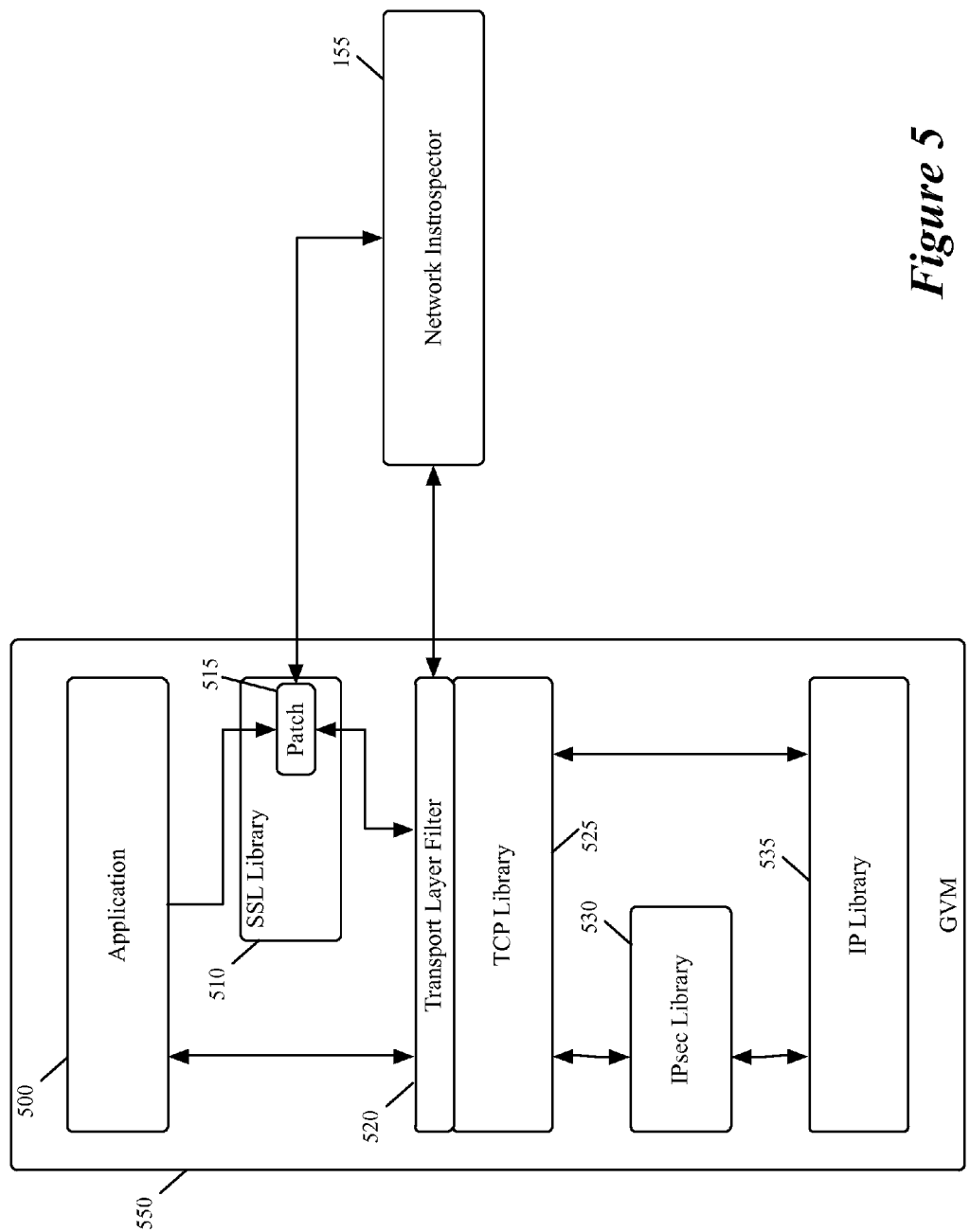
FIG. 5 illustrates how the approach of FIG. 2 works well for URL filtering of encrypted traffic.

FIG. 5 illustrates how the approach of FIG. 2 works well for URL filtering of encrypted traffic. Specifically, FIG. 5 shows the network introspector 155 obtaining GI data from two different network layers of a GVM 550. As shown, multiple layers of software execute on the GVM 550. These layers include an application 500 (e.g., a browser), an SSL library 510, a TCP library 525, an IPsec library 530, and an IP library 535. In some embodiments, the SSL, TCP, IPsec and IP libraries are part of the network stack that is provided by the GVM's operating system.

FIG. 5 shows the network introspector 155 of some embodiments obtaining GI data from the transport layer filter 520 and a patch filter 515 in the SSL library 510. The transport layer filter 520 captures transport layer calls that the application 500 makes to the TCP library 525. As mentioned above, one example of such a filter is the TDI filter. The SSL patch filter 515 captures SSL encryption calls that the application 500 makes to the SSL library. The SSL encryption encrypts the TCP payload.

Instead of using SSL encryption to capture the TCP payload, the IP payload can be encrypted by using the IPsec library 530. Accordingly, for IPsec encryption, the data is encrypted after leaving the TCP layer 525 and entering the IP layer 535, which, in turn, allows the transport layer filtering (e.g., the TDI filtering) to capture the data before it enters the TCP stack. Hence, through this filtering, the network introspector can capture the unencrypted data before entering the L3 IPsec security stack. In this manner, the transport layer filtering of some embodiments is entirely agnostic of the encapsulation and de-capsulation of frames involved in L3 encryption. In this case, there is no need to decrypt or re-encrypt traffic in order to do URL filtering.

When SSL encryption is used, the data is already encrypted by the time it reaches the transport layer driver. To address this situation, the network introspector 155 of some embodiments needs to use a Layer 5/6 patch to capture the API calls in the context of certain applications (e.g., know browsers). The SSL patch 515 is one example of such a patch. As mentioned above, the SSL patch captures SSL encryption calls that the application makes to the SSL library.

Windows provides SSL library APIs that are consumed by all Microsoft applications including Internet Explorer, Outlook, IIS etc. In these applications, SSL functions are implemented over Security Service Provider Interface (SSPI), which is a standard set of functions exposed for all windows security related functions including Kerberos, NTLM and SSL.

By using the SSL patch 515 to capture the interface calls (e.g., EncryptMessage and DecryptMessage), the network introspector 155 extracts the raw data provided by the application for encryption. Most other non-Microsoft applications use openSSL library for SSL client/server applications. By capturing the SSL dynamic link library (DLL) calls (e.g., SSL Connect, SSL read and SSL Write), the network introspector can capture the unencrypted data including the HTTP request that is to be sent to the remote destination.

Figure 6:
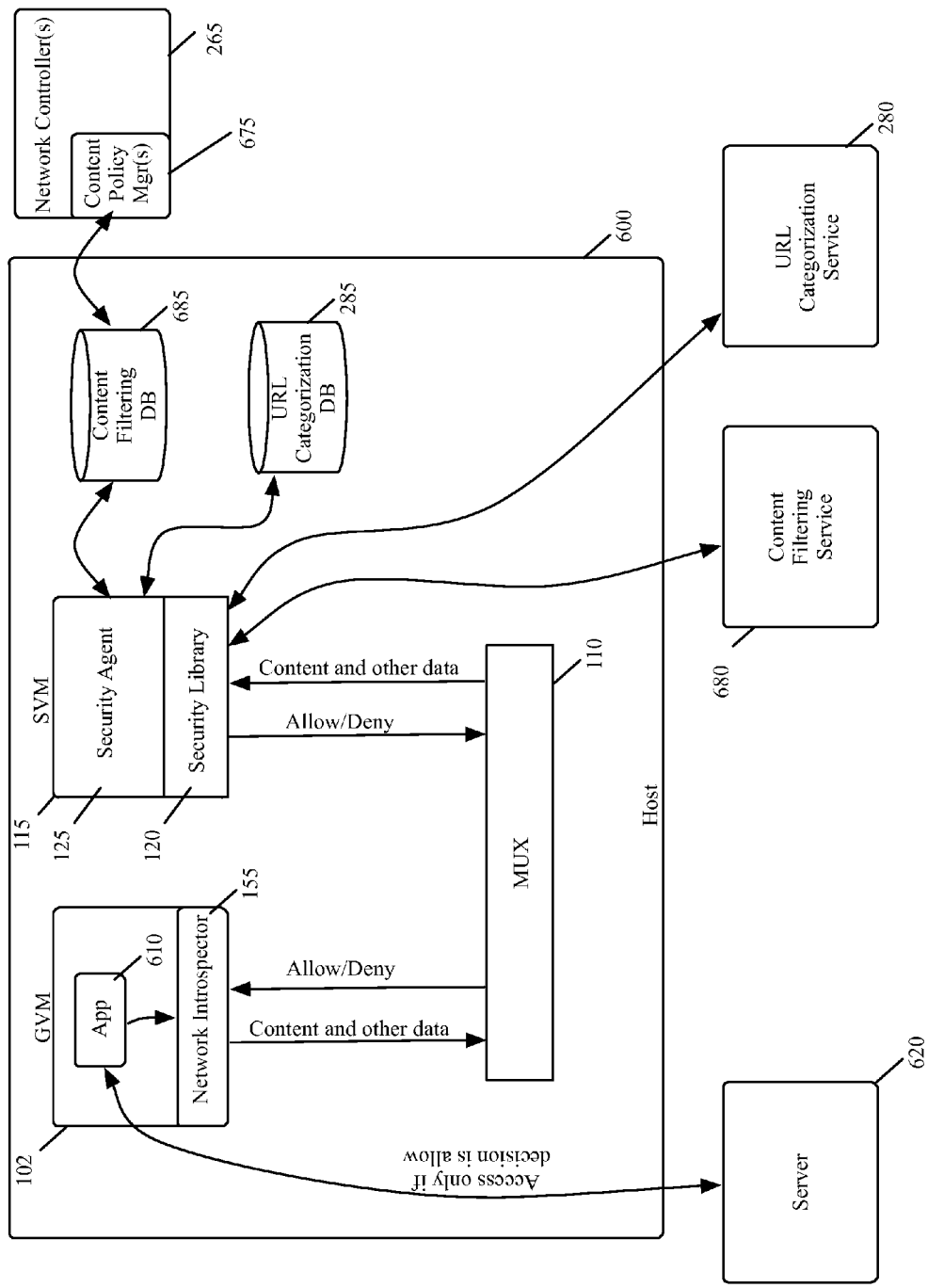
FIG. 6 illustrates how the GI architecture of some embodiments can be used to filter content shared over the web with external sites.

FIG. 6 illustrates how the GI architecture of some embodiments can be used to filter content shared over the web with external sites (such as Dropbox or other file sharing websites). Such filtering can prevent data leaks in the case of sensitive data being shared with external site. This GI architecture is implemented on a host that executes a GVM 102 and SVM 115. This architecture is similar to the architecture of FIG. 2, except it now also includes content filtering policy manager(s) 675, a content filtering data storage 685 and a cloud-based content filtering service provider 680.

In FIG. 6, the network introspector 155 captures connections initiated by a user application 610 (e.g., a browser) of a GVM 102 through a transport layer filter (such as the TDI filter) or a higher layer filter (such as an SSL patch). Through this filter, the network introspector 155 can also capture content that is intended for transmission to an external server 620. The introspector provides the captured connection and content data to the SVM 115, which, in turn, uses the content filtering service provider 680 or content filtering library 685 to identify rules that are applicable to the captured content. As further described below, such rules may prohibit the transfer of the desired content to the server 620.

As shown, the GI architecture of FIG. 6 also includes the URL categorization service provider 290 and the URL categorization database 285. These categorization resources are used in some embodiments to categorize the URL associated with the server 620, and subsequently to use the identified category in assessing whether the content can be transferred to the server 620, as further described below.

In some embodiments, a set of one or more controllers 265 publishes the policies for URL and content filtering as defined by a security administrator. As shown, the policies are published by one or more policy managers 675 that execute on one or more controllers in the controller set 265, and these published policies are stored in the content filtering data storage 685. In the example illustrated in FIG. 6, the SVM 215 that performs the filtering operation, executes on the same host 600 as the GVM 202 in which the application 610 operates. In other embodiments, the SVM executes on a different host than the GVM 202.

Figure 7:
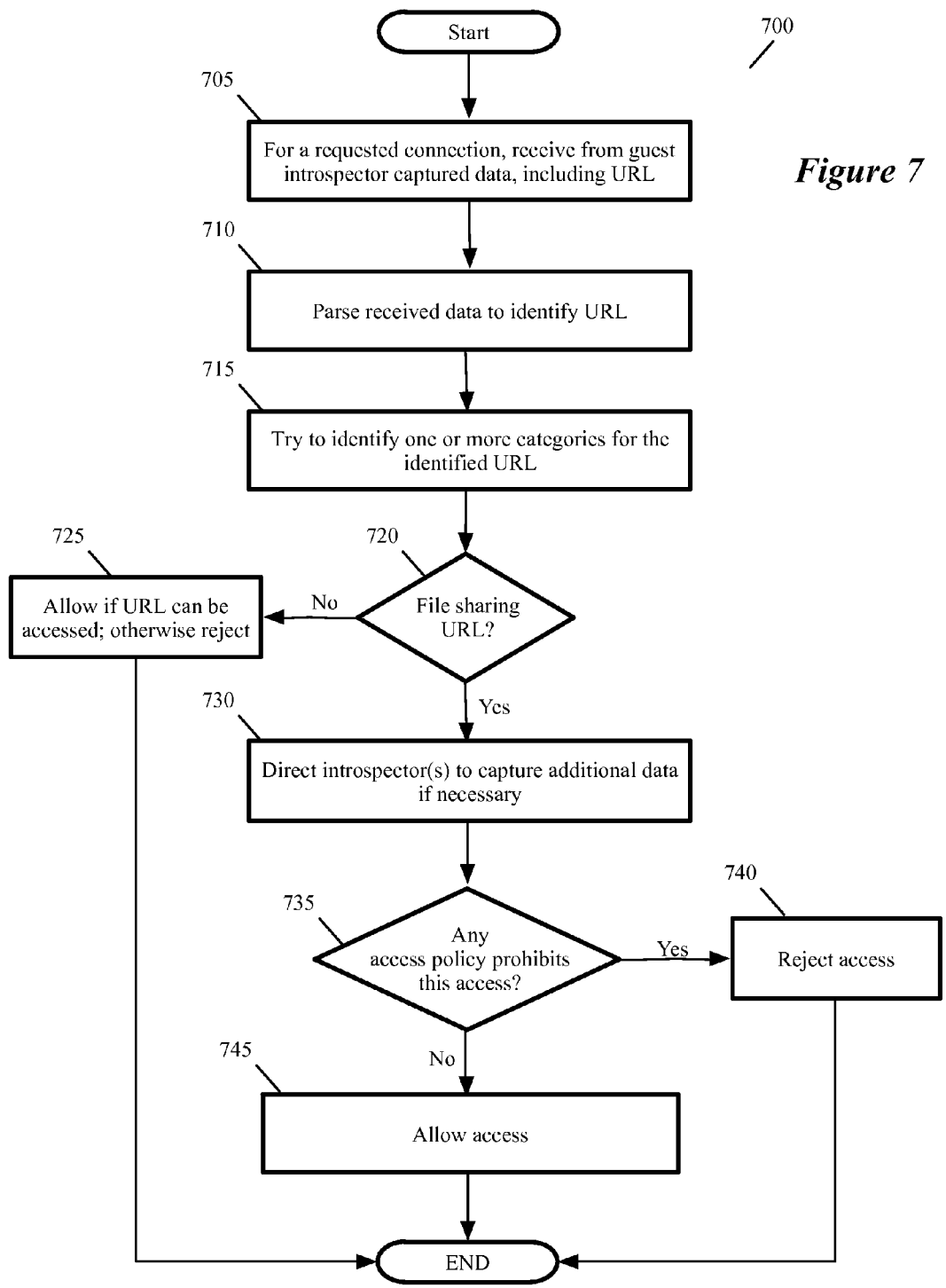
FIG. 7 presents a process that conceptually illustrates the operation of the SVM's security agent of FIG. 6 when a monitored application attempts to share content stored on the GVM with another device through a network access.

FIG. 7 presents a process 700 that conceptually illustrates the operation of the SVM's security agent 125 of FIG. 6 when a monitored application attempts to share content stored on the GVM with another device through a network access. By performing these operations, the security agent 125 can determine whether the attempted access should be allowed. As shown, the process 700 initially receives (at 705) data from the network introspector 155 for a connection that the application 610 is attempting to make to a web resource that is identified by a URL.

In some embodiments, the process 700 receives this data when the network introspector 155 captures and blocks the start of a web sharing access. As mentioned above, the network introspector in some embodiments configures a transport layer or higher layer filter to intercept data traffic in the datastream for every connection, including the payload of one outgoing packet to capture the URL that is being examined. In some embodiments, the captured data includes (1) the outgoing connection request that identifies a new network connection, (2) contextual information (e.g., the process identifier) that identifies the application making the connection request and/or a user identifier that identifies the user for which the application is making the attempted the network access, and (3) one outgoing data packet that identifies the URL that is being accessed. In some embodiments, the network introspector captures the connection request and contextual information at a different time than the URL, as described above.

The network introspector 155 passes the captured data to the SVM 115, so that the SVM can determine whether the captured and blocked connection should be allowed or denied. Upon receiving the GI captured data (including contextual data and outgoing data packet), the agent 125 parses (at 710) the payload of the first data packets in order to identify the URL associated with the connection. Next, at 715, the agent 125 identifies one or more categories for the URL by interfacing with either a cloud-based URL categorization service provider 280 or a local database 285. This interaction was described by reference to FIG. 3, and will not be further described here as URL categorization of process 700 is similar to the URL categorization of process 300 in some embodiments.

After trying (at 715) to identify a category for the URL, the security agent 125 determines (at 720) whether the URL being accessed is categorized as "File Sharing." If not, the security agent 125 examines (at 725) the URL access policies in a URL-access policy storage (like storage 290, which is not shown in FIG. 6) to determine (at 725) whether it should allow or deny the requested connection to the web resource identified by the URL. In some embodiments, the security agent allows the access (at 725) when it cannot find any URL-access policies in the policy storage that rejects this access. Also, the resolution of these policies in some embodiments is dependent on the category or categories that the process identified for the URL at 715. Several examples of URL-access policies were provided above by reference to FIGS. 3 and 4, and will not be further described here as these examples are equally applicable to the process 700 of FIG. 7.

When the process 700 identifies (at 725) a policy that requires the network access to be rejected, the process 700 returns (at 725) a Deny to the network introspector so that it can reject the attempted network access. On the other hand, when the process cannot identify (at 725) a policy that requires the network access to be rejected, it returns (at 725) an Allow to the network introspector, so that it can allow the attempted access. After 725, the process ends.

When the process 700 determines (at 720) that the captured URL is a "File Sharing" URL, the process 700 in some embodiments directs (at 730) the network introspector to capture additional data in the datastream for the requested connection. In other embodiments, the process 700 does not request (at 730) additional captured data as all the data that it needs was previously supplied at 705. Next, at 735, the process uses all of the captured GI data to assess whether it should allow the access to the content sharing site. In some embodiments, the process makes this assessment by using the captured GI data to assess the content-sharing policies in the policy storage 685. Alternatively, or conjunctively, the process makes this assessment in some embodiments by forwarding the captured GI data to the cloud-based content filtering service 680, which uses this data to assess the file-sharing policies that it enforces.

When the process 700 determines (at 735) that it should reject the attempted network access based on a policy in the local policy storage 685 or a policy enforced by the service 680, the process returns (at 740) a Deny to the network introspector so that it can have the filter (e.g., TDI or SSL filter) reject the attempted network access. After 740, the process ends. On the other hand, when the process cannot identify (at 735) a policy that requires the network access to be rejected, it returns (at 735) an Allow to the network introspector, so that it can have its filter allow the attempted access. After 745, the process ends.

In some embodiments, the security agent 125 follows slightly different process to perform its content-sharing access check. For instance, in some embodiments, the agent does not rely on the URL categorization to assess whether content can be shared with a site. In these embodiments, or in the embodiments in which the security agent 125 uses URL categorization to enforce content-sharing access check, the agent's content-sharing process loops through operations 730-745, whenever it detects that the network access is trying to access another file for content.

To do this, the security agent uses the file introspector 150 to monitor access to files by the application that is attempting the network access. As mentioned above, the network introspector 155 in some embodiments identifies the network-accessing application initially when it detects an attempted network access. The network introspector 155 passes the identity (e.g., the process identifier) of this application to the security agent, which can then provide this application ID to the file introspector with a request that the file introspector detect the application's access to each file and notify the security agent of each detected access. The file introspector uses filters that it sets in the GVM's file system to identify any access of the identified application to all files or certain files (e.g., files of a particular category, such as non-system files, or data files) that are managed by the file system.

In some embodiments, the security agent has the file introspector block the application's access to certain files until the agent approves of the access. In some embodiments, the SVM's security agent has the file introspector provide metadata regarding the file that the application is trying to access. Based on this metadata, the security agent in some embodiments reviews its content filtering policies to determine whether the file access should be allowed or denied. In some embodiments, the agent through the file introspector and the MUX scans the content of the file to detect one or more particular types of sensitive content, such as HIPAA data, PCI data, etc. When the agent identifies such data, the agent directs one of the introspectors to block the application's access to the file, or the application's transmission of the file or its content through a network connection. In some embodiments, the particular types of sensitive content can be defined for the SVM and the file introspector by policies that are stored on the host and accessible by the SVM.

Alternatively, or conjunctively, the security agent prevents file-sharing network accesses by having the network introspector enforce the network access to certain files. For instance, after detecting that a monitored application is accessing a particular file, obtaining metadata regarding the particular file from the file introspector, and determining from the metadata that the particular file contains confidential data (e.g., confidential health related data), the security agent has the network introspector capture the data for the packets that the application wants to send through the network access, so that the agent can determine whether the captured data relates to the particular file. When the captured data relates to the particular file and such data need to be blocked, the security agent has the network introspector reject the attempted transmission of the data.

Figure 8:
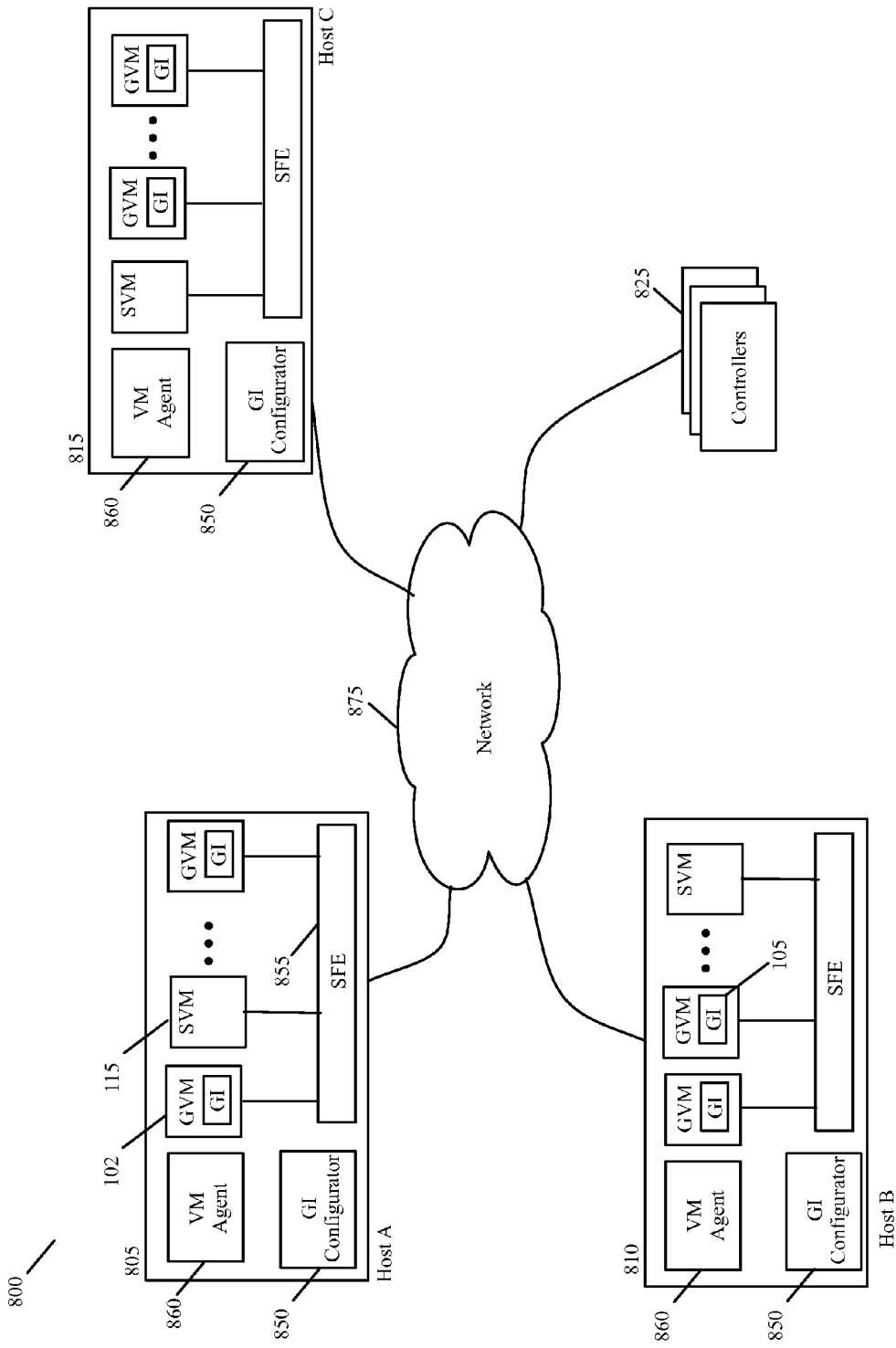
FIG. 8 illustrates a multi-host system of some embodiments that uses the GI method of some embodiments.

FIG. 8 illustrates a multi-host system 800 of some embodiments that uses the GI method of some embodiments. This system is part of a software defined data center in some embodiments. As shown, this system includes multiple hosts 805-815, a set of one or more controllers 825, and a network 875. The network 875 communicatively couples the hosts with each other and with the controller set. In some embodiments, the network is a local area network (LAN), a wide area network (WAN), and/or a network of networks (e.g., Internet).

In some embodiments, the controller set 825 provides control and management functionality for defining (e.g., allocating or instantiating) and managing one or more GVMs and SVMs on the host computing devices 805-815. The controller set 825 also provide control and management functionality for configuring the introspectors of the GVMs. In addition, controller set 825 also provide control and management functionality for defining and managing multiple logical networks that are defined on the common software forwarding elements of the hosts. In some embodiments, the controller set 825 includes multiple different sets of one or more controllers for performing different sets of the above-described controller operations.

In some embodiments, the hosts 805-815 are similar to the hosts 100, 200 and 600 of FIGS. 1, 2, and 6. However, in FIG. 8, some of the modules (e.g., the MUX 110, security agent 125, security library 120, introspectors 150-160, etc.) that were illustrated in FIGS. 1, 2, and 6 are not shown in order not to obscure the discussion of FIG. 8 with unnecessary detail. On the other hand, in FIG. 8, other modules are shown to emphasis other functionalities of the hosts of some embodiments. These other modules include software forwarding element 855, VM configuration agent 860, and GI configurator 850.

The software forwarding element (SFE) 855 on the host communicatively couples the GVMs and SVMs of the host to each other, and to other devices outside of the host (e.g., VMs on other hosts) through the host's NIC and the intervening network 875. One example of such an SFE is a software switch. In some embodiments, an SVM communicates with GVMs on its host through a different forwarding element or through a different communication channel. However, even in some of these embodiments in which an SVM communicates with GVMs outside of its host, the SVM communicates with these GVMs through the SFE 855.

In some embodiments, one host's SFE implement one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

In FIG. 8, each host's VM agent 860 communicates with the controller set 825. Through this communication, the VM agent can receive configuration data for configuring the operation of the GVMs and SVMs that operate on the agent's host. In some embodiments, a different set of one or more VM agents is used on one host for the GVMs than the set of one or more VM agents that is used for the SVM(s) on that host. In some embodiments, the VM agents receive from the controller set 825 network access policies for their respective SVMs, and store these policies in the SVM policy storage(s) (e.g., storage 290 and/or storage 685). In other embodiments, the VM agents generate some or all of these policies from the configuration data that they receive from the controller set 825.

Also, each host's GI configurator 850 communicates with the controller set 825 to receive configuration data for configuring the operation of the guest introspectors of the GVMs. The configuration data in some embodiments directs how each introspector's should configure its network stack filters (e.g., its transport layer filter or SSL patch filter) and the type of data that it should direct each filter to capture. In some embodiments, the configuration data further configures the type of captured data that each introspector should report to its associated SVM.

Figure 9:
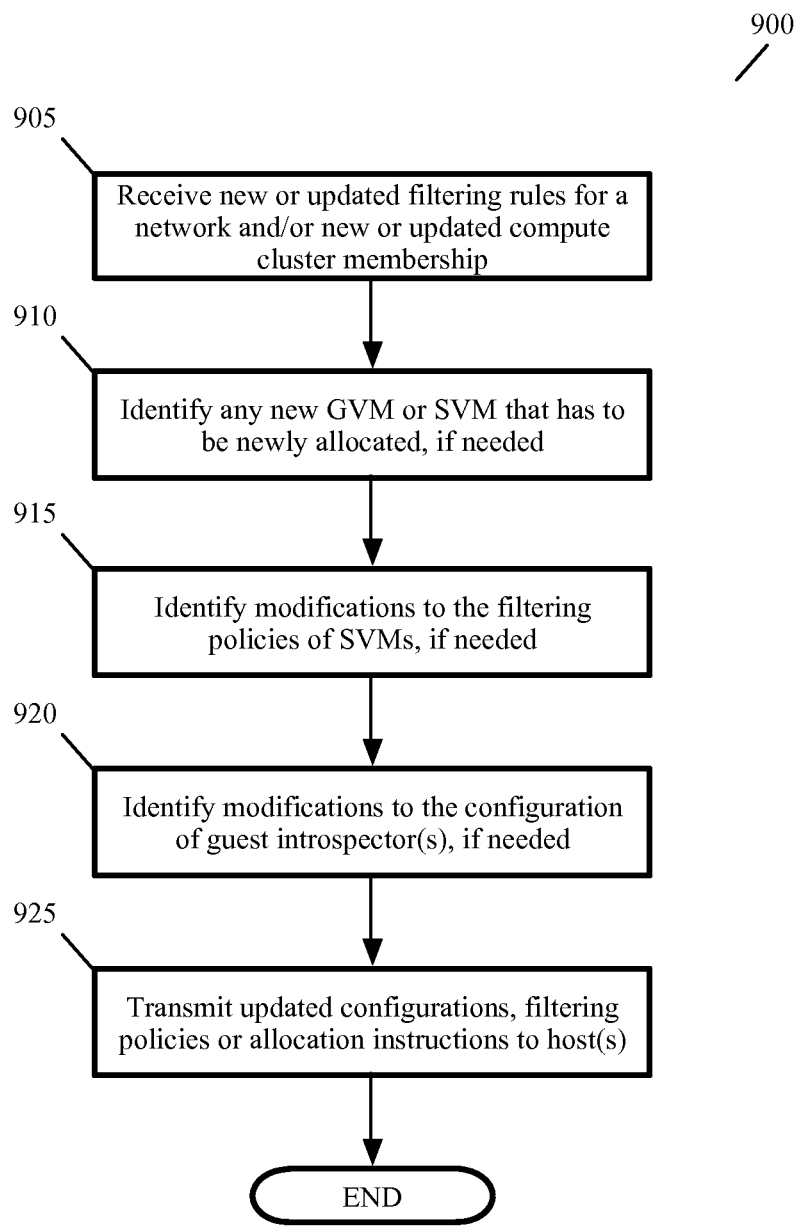
FIG. 9 conceptually illustrates a process that a set of one or more controllers performs to configure the GI method of some embodiments.

FIG. 9 conceptually illustrates a process that a set of one or more controllers performs to configure the GI method of some embodiments. As shown, this process starts (at 905) each time a new or updated compute cluster membership is received (e.g., from a network administrator), and/or a new or updated set of rules for performing network access filtering is received (e.g., from a network administrator). After receiving such data, the process identifies (at 910) any new GVM or SVM that it has to instantiate or allocate on one or more hosts to implement the new or updated compute cluster membership and/or network access filtering. For each identified GVM or SVM, the process defines configuration data at 910.

Next, at 915, the process identifies new or modified filtering policies for one or more SVMs, if such new or modified policies are needed to implement the new or updated compute cluster membership and/or network access filtering. For each identified filtering policy, the process defines configuration data at 915. After 915, the process identifies (at 920) new or modified configurations for one or more guest introspectors (e.g., introspectors 150-160), if such new or modified configurations are needed to implement the new or updated compute cluster membership and/or network access filtering. At 920, the process defines configuration data to implement any new or modified GI configuration.

Lastly, at 925, the process distributes any configuration data that it generates at 910-920 to the VM configurator agent 860 and GI configurators 850 of each host that has a GVM, SVM, or guest introspector that has to be configured to account for the new or updated compute cluster membership and/or a new or updated set of network access filtering rules that are received at 905. After 925, the process ends.

One of ordinary skill will realize that the process 900 of FIG. 9 is just a conceptual illustration of the set of operations that one or more controllers have to perform to configure the guest introspectors and SVMs of some embodiments, so that these modules can perform the GI method of some embodiments. In some embodiments, multiple different processes on one or several controllers perform these operations. Also, the sequence of these operations differs in some embodiments of the invention.

The following example is illustrative of how the controller set 825 configures the guest introspectors to perform URL and content filtering in a hospital's software defined data center (SDDC). The datacenter has several users who may be part of different Active Directory groups such as Doctors and Nurses. The datacenter also runs the hospital servers that have confidential patient data. The security administrator deploys a guest introspection-based URL filtering and web content filtering service provided by defining the following web security policies (called SecPols below):

SecPol 1: No users can access social networking websites;

SecPol 2: No users can post confidential patient HIPAA data to file sharing websites;

SecPol 3: Doctors are allowed access to healthcare websites; and

SecPol 4: All users are allowed access to web email category.

In order to comply with the security policy above, the security administrator has the controller set perform the following steps:

Create Security Group (SG) Doctors with dynamic membership criteria so that any VM with a doctor logged on it becomes a member, and drops out of membership when the doctor logs off.

Create SG Nurses with dynamic membership criteria so that any VM with a nurse logged on it becomes a member, and drops out of membership when the nurse logs off.

Create URL filter policies for the Doctors SG allowing access to healthcare and web-email categories and denying access to social networking category.

Create URL filter policies for the nurses SG allowing access to web-email categories and denying access to healthcare and social networking category.

Create content filter policies in Doctors SG that inspect all content on file-sharing URLs and deny access if the content includes HIPAA data The controller set 825 pushes these policies to the SVMs deployed on every host to do URL and/or content filtering. When a nurse or a doctor logs on to a GVM, the SG will automatically be populated with that GVM as a member for the appropriate SG. When a doctor tries to access Facebook, the network introspector 155 of the GI agent 105 (that is installed on the GVM by the of VM configurator agent 860) intercepts the connection. Since the connection is originating from a browser application and the SG that the GVM is a member of has a URL filtering policy, the connection information is sent to the SVM on the same host as the GVM. The SVM then lets this connection proceed but requests the next data packet in the stream for this connection. Once it receives the next data packet, the SVM parses this packet for the URL, which it then categorizes as a "social networking" website by using the local URL categorization database 285 or the cloud-based URL categorization service 280. The SVM then examines this category against the policies pushed down to the SVM by the controller set. In this example, the doctor's access is denied because there is a policy that requires access to social-networking URLs by doctors to be denied.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
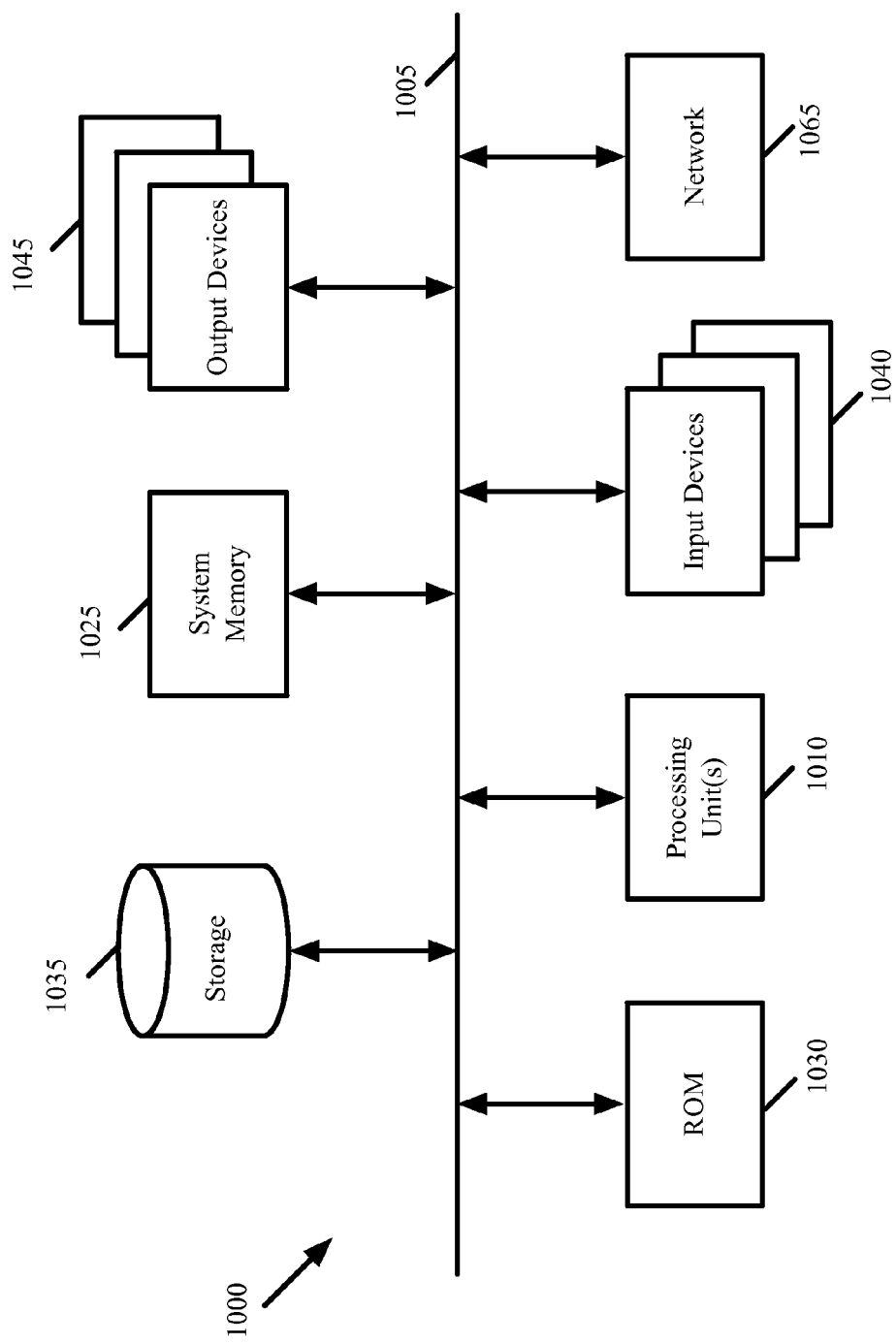
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs). DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

Several examples were described above by reference to URL filtering policies. In place of URL filtering policies, some embodiments employ URI (uniform resource identifier) policies. As commonly understood, URLs are one form of URIs. A number of the figures (e.g., FIGS. 3, 7, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

We claim:

1. A host computer comprising:
a set of processing units for executing instructions;
a non-transitory machine readable medium storing:
a plurality of data compute nodes (DCNs) with a plurality of guest introspectors installed on the plurality of DCNs for capturing data regarding network access attempts on the DCNs;
at least one service compute node (SCN) (i) to receive captured data regarding network access attempts from a set of guest introspectors on the host computer, (ii) to reject a network access attempt when a network access policy stored on the host computer requires rejection of the network access, and (iii) to allow a network access when no network access policy stored on the host computer requires rejection of the network access,
at least one of said guest introspectors to send to the SCN network-access data from a DCN before the data is encrypted by an encryption module of the DCN, and to send the network-access data to the encryption module only when the SCN allows the network-access data.

2. The host computer of claim 1, wherein the host receives, from a set of network controllers, a set of network access policies that is enforced by an SCN on the host computer, wherein each network controller is stored in a non-transitory machine readable medium on a computer.

3. The host computer of claim 2, the non-transitory machine readable medium of the host computer further storing an SCN agent that receives the set of network access policies and configures the host computer's SCN to use the received set of network access policies.

4. The host computer of claim 1, wherein the host computer receives, from a set of network controllers, data to define a set of network access policies that is enforced by an SCN on the host computer, wherein each network controller is stored in a non-transitory machine readable medium on a computer,
wherein the non-transitory machine readable medium of the host computer further stores an SCN agent that receives the provided data and generates the set of network access policies for the SCN on the host computer to enforce.

5. The host computer of claim 1, wherein each guest introspector is configured by a set of network controllers to capture a plurality of sets of data for a plurality of types of network access through the DCN on which the guest introspector is installed, wherein each network controller is stored in a non-transitory machine readable medium on a computer.

6. The host computer of claim 1, wherein each guest introspector is configured by a set of network controllers to capture at least one set of data associated with at least one type of network access through the DCN on which the guest introspector is installed, wherein each network controller is stored in a non-transitory machine readable medium on a computer.

7. The host computer of claim 1, wherein the data captured by at least one guest introspector includes contextual information relating to at least one of a user and an application that is attempting a network access.

8. The host computer of claim 1, wherein the data captured by at least one guest introspector includes file-system events.

9. The host computer of claim 1, wherein the data captured by at least one guest introspector includes metadata about one or more files that an application is accessing for a network access.

10. The host computer of claim 1, wherein the guest introspectors are further for processing requests from the SCN in order to capture more data about network access attempts.

11. The host computer of claim 1, wherein the network access attempts include network access attempts that are intended to send content out of the host computer and network access attempts that are intended to pull content from the host computer.

12. The host computer of claim 1, wherein the guest introspectors include network introspectors that filter network socket calls including connect and close-socket calls.

13. The host computer of claim 1, wherein the encryption module is an encryption library associated with one of a fourth transport layer, a fifth session layer, and a sixth presentation layer of the open system interconnection (OSI) model.

14. A method for filtering network access on a host computer on which data compute nodes (DCNs) execute, the method comprising:

configuring a plurality of guest introspectors installed on a plurality of DCNs to capture data regarding network access attempts on the DCNs;

configuring at least one service compute node (SCN) executing on the host computer (i) to receive captured data regarding network access attempts from a set of guest introspectors on the host computer, (ii) to reject a network access attempt when a network access policy stored on the host computer requires rejection of the network access, and (iii) to allow a network access when no network access policy stored on the host computer requires rejection of the network access; and wherein at least one guest introspector is configured to send to the SCN network-access data from a DCN before the data is encrypted by an encryption module of the DCN, and to send the network-access data to the encryption module only when the SCN allows the network-access data.

15. The method of claim 14, wherein configuring the guest introspectors comprises configuring each guest introspector to capture a plurality of sets of data for a plurality of types of network access through the DCN on which the guest introspector is installed.

16. The method of claim 14, wherein configuring the guest introspectors comprises configuring each guest introspector to capture at least one set of data associated with at least one type of network access through the DCN on which the guest introspector is installed.

17. The method of claim 14, wherein the data captured by at least one guest introspector includes contextual information relating to at least one of a user or an application that is attempting a network access.

18. The method of claim 14, wherein the data captured by at least one guest introspector includes file-system events.

19. The method of claim 14, wherein the data captured by at least one guest introspector includes metadata about one or more files that an application is accessing for a network access.

20. The method of claim 14, wherein the guest introspectors are further for processing requests from the SCN in order to capture more data about network access attempts.

21. The method of claim 14, wherein the encryption module is an encryption library associated with one of a fourth transport layer, a fifth session layer, and a sixth presentation layer of the open system interconnection (OSI) model.

\* \* \* \* \*